United States Patent
Khuri-Yakub et al.

(10) Patent No.: US 6,493,288 B2
(45) Date of Patent: Dec. 10, 2002

(54) WIDE FREQUENCY BAND MICROMACHINED CAPACITIVE MICROPHONE/HYDROPHONE AND METHOD

(75) Inventors: Butrus T. Khuri-Yakub, Palo Alto, CA (US); Abdullah Atalar, Ankara (TR); Arif S. Ergun, Mountain View, CA (US); F. Levent Degertekin, Decatur, GA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/728,713

(22) Filed: Nov. 30, 2000

(65) Prior Publication Data

US 2002/0048220 A1 Apr. 25, 2002

Related U.S. Application Data

(60) Provisional application No. 60/172,390, filed on Dec. 17, 1999.

(51) Int. Cl.[7] .............................................. H04R 19/00
(52) U.S. Cl. ...................................................... 367/181
(58) Field of Search ................................ 367/181, 174; 381/174, 191

(56) References Cited

U.S. PATENT DOCUMENTS

| | | | |
|---|---|---|---|
| 5,619,476 A | 4/1997 | Haller et al. ............... | 367/181 |
| 5,870,351 A | 2/1999 | Ladabaum et al. .......... | 367/163 |
| 5,894,452 A | 4/1999 | Ladabaum et al. .......... | 367/163 |
| 5,982,709 A | 11/1999 | Ladabaum et al. .......... | 367/170 |
| 6,262,946 B1 * | 7/2001 | Khuri-Yakub et al. ...... | 367/181 |

OTHER PUBLICATIONS

Calmes et al., "Highly Integrated 2–D Capacitive Micromachined Ultrasonic Transducers" *IEEE Ultrasonics Symposium*, 1999 1163–1166.

Ronnekleiv, et al., "An Improved Circuit Model of MUTs" *IEEE Ultrasonics Symposium*, 1997, 395–399.

Jietanen, Jarmo, "Internal coupling of miltiple–sized cavities in a capacitive ultrasonic transducer", *Sensors and Actuators*, A 65, 1998, 30–32.

Haller, et al., "A Surface Micromachined Electrostatic Ultrasonic Air Transducer", *IEEE Transactions on Ultrasonics Ferroelectrics and Frequency Control*, 43 (1996), Jan., No. 1, New York.

Ergun, et al, "A New Detection Method for Capacitive Micromachined Ultrasonic Transducers", *IEEE Ultrasonics Symposium* 1998, 1007–1010.

* cited by examiner

*Primary Examiner*—Daniel T. Pihulic
(74) *Attorney, Agent, or Firm*—Dorsey & Whitney LLP (57) ABSTRACT

A wide frequency band micromachined microphone including a plurality of micromachined cells of the type including electrodes carried by a membrane supported above a common electrode with conductive lines interconnecting the electrodes is described. A method of operating a microphone array is also described.

16 Claims, 7 Drawing Sheets

FIG_1

FIG_2

FIG_3

FIG_4

FIG_5

FIG_6

FIG_7

FIG_8

FIG_9

FIG_10

FIG_11

FIG_12

FIG_13

FIG_14

FIG_15

FIG_16

FIG_17

FIG_18

FIG_19

WIDE FREQUENCY BAND MICROMACHINED CAPACITIVE MICROPHONE/HYDROPHONE AND METHOD

RELATED APPLICATIONS

This application claims priority to provisional application Ser. No. 60/172,390 filed Dec. 17, 1999.

BRIEF DESCRIPTION OF THE INVENTION

This invention relates generally to a wide frequency band capacitive microphone and method and more particularly to a microphone which includes a plurality of micromachined capacitive elements and more particularly to a microphone in which the capacitive elements are connected as a transmission line whereby vibrations of the microphone membranes modulate the length of the transmission line, and still more particularly to acoustic signal direction sensing microphones, pressure sensing transducers, wireless microphones and hydrophones.

BACKGROUND OF THE INVENTION

A good microphone has several qualities: it must be able to detect a minimum pressure of $2\times10^{-5}$ Pa of pressure that corresponds to the minimum detectable sound level by the human ear, and it must operate over a broad frequency range. A recent stated frequency range requirement for many military applications is 1 mHz–200 KHz. Another requirement is robustness in that the microphone has to be operable outdoors without humidity and condensation deteriorating or destroying its operation. The microphone has to be small. It should withstand shock, high accelerations and high temperatures. Preferably, it should have directionality.

In order to have broad bandwidth, past designs have utilized damped structures where a backplate with many holes and a damping back pocket of air makes one side of a capacitor. A diaphragm, which makes the other side of the capacitor, is held with very soft springs over the back plate of the capacitor, and a traditional detection scheme is used to measure the displacement of the diaphragm. This approach suffers from low sensitivity, especially at low frequencies, and lack of robustness when it comes to use outdoors in humid environments.

OBJECTS AND SUMMARY OF THE INVENTION

It is an object of the present invention to provide a micromachined capacitive microphone operable over a wide frequency range.

It is another object of the present invention to provide a microphone which comprises a plurality of sealed micromachined capacitors.

It is a further object of the present invention to provide a self-cleaning micromachined microphone.

It is a further object of the present invention to provide an acoustic signal direction sensing capacitive micromachined ultrasonic microphone.

It is a further object of the present invention to provide an array of microphones operating from dc to 200 KHz frequency or more.

It is another object of the present invention to provide an array of microphones which can be co-located with respect to each other.

It is a further object of the present invention to provide a microphone for detecting sound and generating signals which can be transmitted to a remote receiver.

The foregoing and other objects of the invention are achieved by a wide-frequency band microphone including a plurality of sealed, evacuated, micromachined capacitive cells each including a membrane supported above a common conductive electrode. Each membrane supports a conductive electrode for movement therewith, whereby each membrane electrode forms a capacitor with the common conductive electrode. The capacitance of the capacitor varies with movement of the membrane responsive to received sound waves. Conductive lines interconnect said conductive electrodes to provide output signals. In another embodiment, the inductance of said lines and the capacitance of the capacitors forms a transmission line whose electrical length changes responsive to movement of said membranes. The membranes may be arranged in two independent parallel rows whereby the change in electrical length of the two transmission lines occur at times which are dependent upon the direction of the incoming sound, thereby permitting determination of the direction of the incoming sound source.

BRIEF DESCRIPTION OF THE DRAWINGS

The foregoing and other objects of the invention will be more clearly understood from the following description when read in conjunction with the accompanying drawings of which.

DESCRIPTION OF PREFERRED EMBODIMENT(S)

Figure 1:
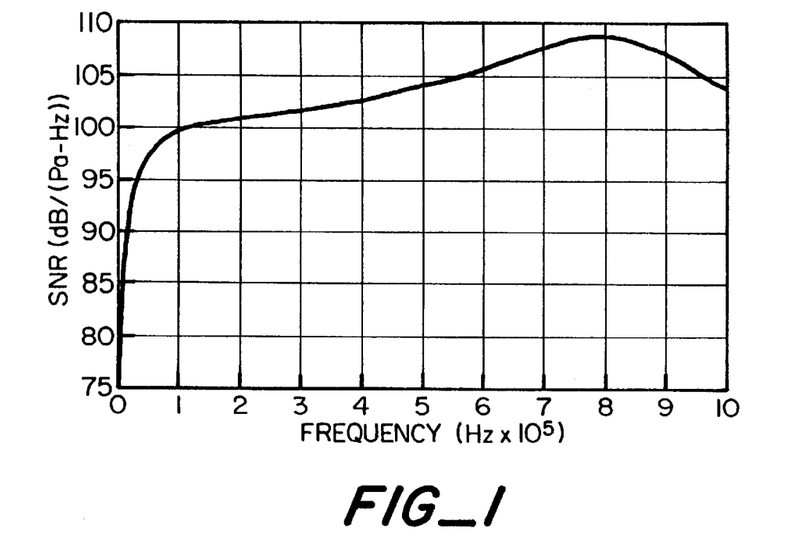
FIG. 1 shows the signal-to-noise ratio of a receiver microphone made using traditional (cMUT) technology.

We approach the problem of making a good microphone from a different perspective. Consider the traditional capacitor micromachined ultrasonic transducers (cMUT) described in U.S. Pat. No. 5,619,476, 5,870,351 and 5,894,452. In particular, consider as a theoretical example a device made with 100 cells where each cell has a diameter of 200 $\mu$m, a gap of 0.5 $\mu$m, and a membrane thickness of 1 $\mu$m. Consider that, in this device, all the individual cells are sealed such that the gap of the capacitor is not open to the environment, and thus can survive humid, indeed even wet environments. When used as a receiver, using the traditional detection scheme, with a dc voltage of 30.745 volts applied across the cells with the output applied to an amplifier with the following characteristics: $R_{in}$=2 M$\Omega$, $C_{in}$=1 pF, $V_{noise}$=1.4 nV/$\sqrt{Hz}$, and $I_{noise}$=0.01 pA/$\sqrt{Hz}$, the signal to noise ratio of the received signal is shown in FIG. 1. It is seen in FIG. 1 that though the resonant frequency of the cMUT microphone indicates best operation at 800 KHz, it is possible to use it, using traditional detection, down to a frequency of 100 KHz and still detect a signal level of less than 1×10$^{-5}$ Pa. At frequencies lower than 100 KHz, a signal is received, but at lower sensitivity. Thus, FIG. 1 shows that broad band operation of a microphone can be obtained using a resonant system operated below resonance at a sacrifice of sensitivity. Also note that, this microphone is sensitive at frequencies much higher than the human audible range. This can be useful in detecting acoustic signals generated by machinery and equipment extending the frequency range of human ear. The device is robust and can handle humid environment because all the cells are sealed and humidity cannot find its way into the gap of the capacitor.

Figure 2:
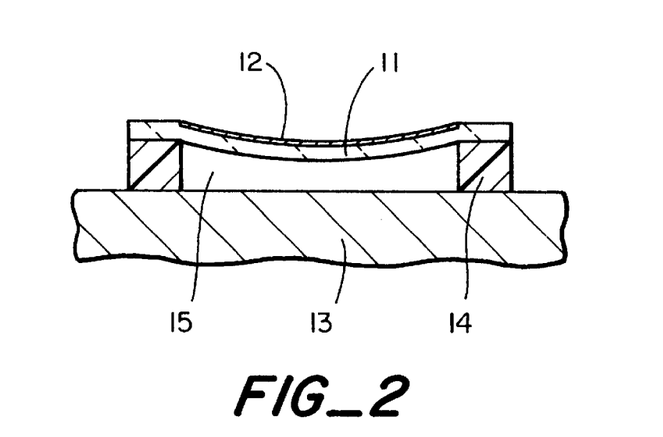
FIG. 2 is a cross-sectional view of a typical cell of a multi-cell cMUT microphone.

Referring to FIG. 2, micromachined capacitive microphones are made up of multiple small sealed, evacuated cells, each including a membrane 11 coated with a metal electrode 12. The membrane 11 is supported at its edges spaced from conductive base 13 by an insulating support 14. The interior volume 15 is evacuated. The geometry and the material of the membrane, and the surrounding medium determine the mechanical response of the microphone. The size of a single membrane is very small, and many are connected in parallel. Using micro-machining technology, the geometry can be precisely controlled, as can the mechanical response of the membranes. The microphones can be designed to have low acoustic impedance over a wide frequency range, which means a good coupling efficiency between the surrounding medium and the microphone. This is the main advantage of the micro-machined capacitive transducers especially in air-borne applications (M. I. Haller and B. T. Khuri-Yakub, "A Surface Micromachined Electrostatic Ultrasonic Air Transducer", *IEEE Ultrasonics Symposium Proceedings* (1998) 1241–1244) (Ladabaum, I., B. T. Khuri-Yakub and D. Spoliansky, "Micromachined Ultrasonic Transducers: 11.4 MHz Transmission in Air and More", *Applied Physics Letters*, Vol. 68, pp. 709 (1996)).

It is seen that the microphone is a simple parallel plate capacitor. An incoming acoustic signal vibrates the membrane, which result in a change in the total capacitance at the incoming acoustical signal frequency. The membrane vibrations are measured by measuring the change in the total capacitance. This is accomplished typically by measuring the current out of the microphone under a constant bias voltage applied across the parallel plates. The resulting current can be expressed as $$I_{out} = V_{DC} \omega_a n C_0 \frac{\Delta x}{x_0} \sin(\omega_a t) \quad (1)$$

$V_{DC}$ is the applied bias voltage, $C_0$ is the total capacitance of a single membrane, n is the number of membranes, $x_0$ is the gap height, $\omega_a$ is the incoming signal frequency and $\Delta x$ is the vibration amplitude of the membranes. This expression shows that the detected signal is proportional to the incoming signal frequency, and therefore degrades considerably at low acoustic signal frequencies, as shown in FIG. 1.

The sensitivity of the microphone is $I_{out}$/Pascal input. The mechanical sensitivity is displacement of membrane (Å)/ Pascal input and the electrical sensitivity is given by $I_{out}$/ displacement of membrane (Å). The smaller the gap between the membrane and substrate, the greater the change in capacitance for a given membrane displacement. However, the micromachined membranes are rather stiff, limiting the electrical output.

In accordance with another embodiment of the present invention, the membrane deflection is detected by the use of RF signals.

It is well known that high frequency or RF electronic circuits are different from low frequency circuits in the sense that the wavelength of the signal used is comparable with the circuit's physical dimensions. Thus, signals are strongly affected by the geometry and the electrical properties of the medium in which they travel. A slight change in these may result in drastic changes in the amplitude and/or the phase of the high frequency signal.

Figure 3:
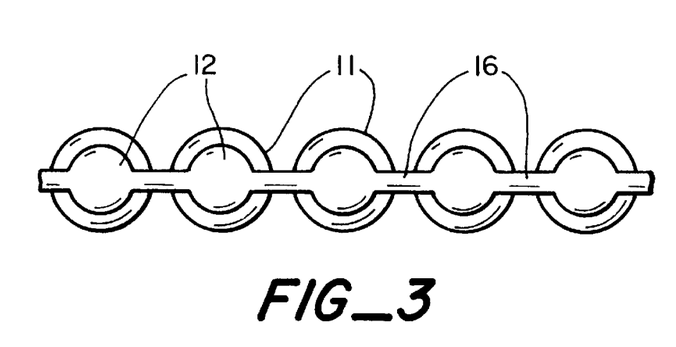
FIG. 3 is a top view of five elements of one row in a multi-row cMUT microphone.
Figure 4:
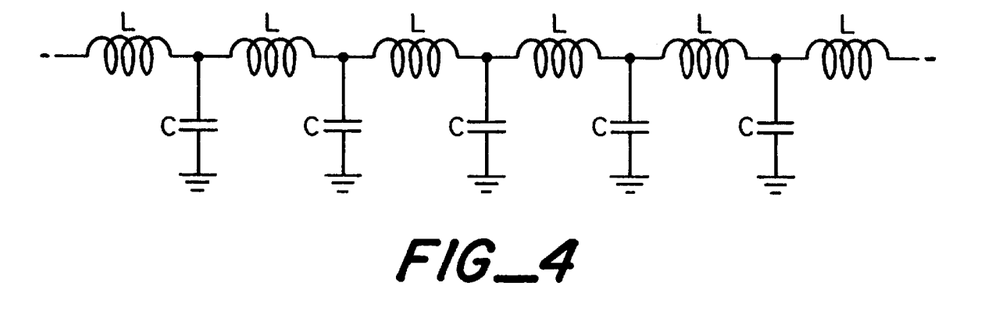
FIG. 4 is the equivalent electrical LC network representative of the cMUT array of FIG. 3.

Consider the acoustic microphone in FIG. 3, which is the top view of five cMUTs having membranes 11 with electrodes 12 connected to each other by an interconnection line 16. However small, the interconnection line has an inductance associated with its length and cross sectional area. Together with the capacitance between the electrode 12 and its conductive support, they make up a device whose lumped element electrical model is a LC network, FIG. 4, called an artificial transmission line.

The characteristic impedance and the propagation constant of such a transmission line are determined by the values of L and C. The electrical length of the line is proportional to the number of membranes, the square root of the capacitance of an individual membrane, and the frequency of operation. If an RF signal is applied at one end of the artificial transmission line, the received signal at the other end will have a phase shift relative to that of the applied RF signal. At low RF frequencies the phase shift is very small, and in effect all the membranes are in parallel. If the frequency of the RF signal is very high the phase shift of the received signal can be very significant, and will be very sensitive to changes in the capacitance of the membranes or changes in the inductance of the connecting lines. Thus, the new method is based on using a high frequency RF signal instead of the conventional DC bias across the capacitors at each membrane. The phase shift of the transmitted signal, rather than current induced by the change in capacitance, is a measure of the membrane deflection. Notice that the circuit has two frequencies: one is the frequency of the incoming (air-coupled or water-coupled) acoustic signal; and the other is the frequency of the RF signal. The RF frequency is chosen to be very high such that the membranes do not respond mechanically at this frequency.

Consider an n-section artificial transmission line, which is made up of n membranes, and an applied RF signal at one port of the line, while the phase of the transmitted signal is measured at the other port. When an incoming acoustic signal vibrates the membranes, the phase of the transmitted signal will vary at the incoming acoustic signal frequency. Thus, the output phase of the RF signal is modulated at the acoustic frequency. This phase modulation is narrow band, which is equivalent to the output having a residual amplitude modulation. The spectrum of the transmitted signal contains a main signal at $\omega_0$ frequency, and two side bands at $\omega_0 \pm \omega_a$, where the magnitude of the side bands is determined by the amplitude of the incoming acoustic signal. The detection of the incoming acoustic signal is accomplished by measuring the side band amplitude at $\omega \pm \omega_a$.

The expression for the current component in each side band is $$I_{out} = \frac{V_{RF}}{4} \omega_0 n C_0 \frac{\Delta x}{x_0} \sin(\omega_a t) \quad (2)$$

where $V_{RF}$ is the RF signal amplitude. Note that the output current is not proportional to $\omega_a$, but rather to $\omega_0$. Thus, this detection scheme can be used, with improved sensitivity over the traditional detection method, for a broad frequency range of acoustic signals. Most importantly, the detection scheme can operate down to DC in terms of the acoustic signal frequency with improved sensitivity and without problems with the so called 1/f noise. Acoustic detection measurements using this new method with RF signal frequencies as high as 20 GHz have been conducted and have yielded very high sensitivities (Ergun, A. S., A. Atalar, B. Temelkuran and E. Ozbay, "A New Detection Method for Capacitive Micromachined Ultrasonic Transducers", *IEEE Ultrasonics Symposium Proceedings* (June 1998). The improvement obtained with this new method as compared to the conventional method can be measured by comparing Equations 1 and 2. The improvement achieved over the conventional detection by using the RF detection is best visualized by considering typical values of DC and RF voltages, and acoustic and RF frequencies, shown in Table 1, which shows an 80 dB improvement for the indicated voltages and frequencies.

TABLE 1

| Parameter | Typical Value |
|---|---|
| $V_{RF}$ | 1 V |
| $V_{DC}$ | 25 V |
| $f_0$ | 1 GHz |
| $f_a$ | 1 KHz |
| $\frac{V_{RF} f_0}{4 V_{DC} f_a}$ | 10000 (80 dB) |

Combining the proposed RF measurement system with the device constructed using cMUT technology, it is clear that the sensitivity can be increased, preferentially at low frequencies, to meet all the microphone requirements. Besides the sensitivity, the device is robust, as humidity does not enter into the gap of the capacitor. On the other hand, the RF measurement system together with the cMUT technology can be used in immersion applications equally well, because of the same reasoning. The membranes are sealed not allowing water to enter the gap between the membrane and the substrate. This means that the microphone and detection scheme we propose can be used in immersion applications, in water or any liquid.

In the proposed approach, the membranes are integrated in the form of an artificial transmission line. The membrane vibrations change the electrical length of the transmission line. One way to measure this change in the electrical length is to use an interferometer, FIG. 5, in which the electrical length of the detector is compared with a reference RF signal which does not change. The result is an amplitude-modulated signal at the incoming acoustical signal frequency. The desired signal is measured by envelope detection. The electrical length $\Phi_1(t)$ of the transmission line is given by its quiescent length $\Phi$ at the RF frequency of the signal $V_{in}$. The change in length $\Delta Q(t)$ induced by the sound waves, that is $\Phi_1(t) = \Phi_0 + \Delta \Phi_1(t)$. The interferometer translates the phase-modulation into amplitude modulation. The envelope detector resolves the ultrasound signal.

Figure 5:
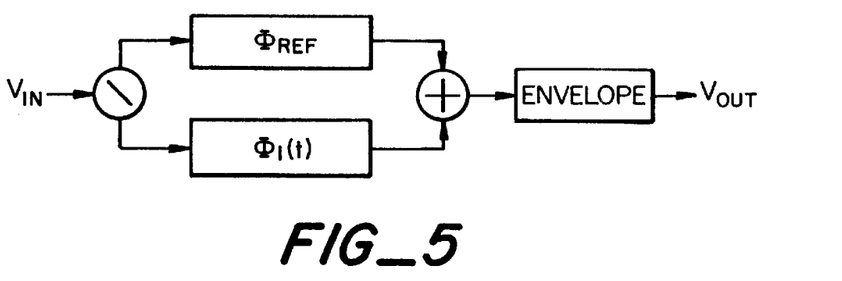
FIG. 5 shows an interferometric sound detection system.

With the proper adjustment of the reference phase length, the resulting output signal for an input signal of $V_{in} = V_{RF} \sin(\omega_0 t)$ is $$V_{out} = V_{RF}\left(1 + \frac{1}{4} a \Phi_0 \frac{\Delta x}{x_0} \sin(\omega_a t)\right) \quad (3)$$

Figure 6:
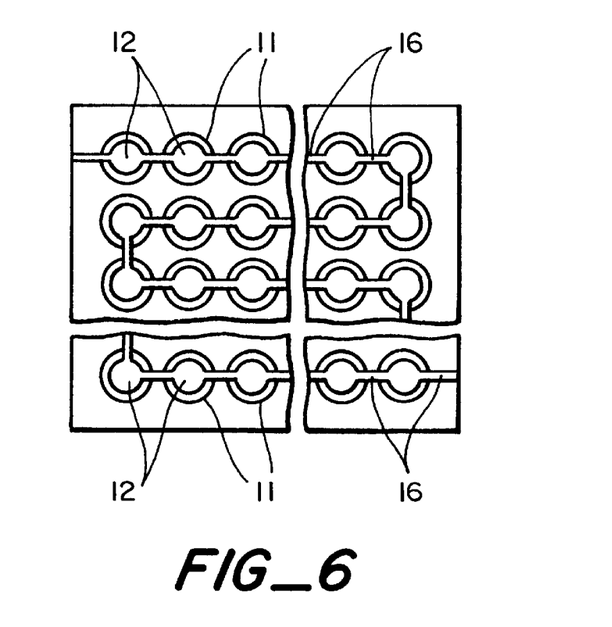
FIG. 6 schematically illustrates a microphone including a plurality of serially connected membranes.
Figure 7:
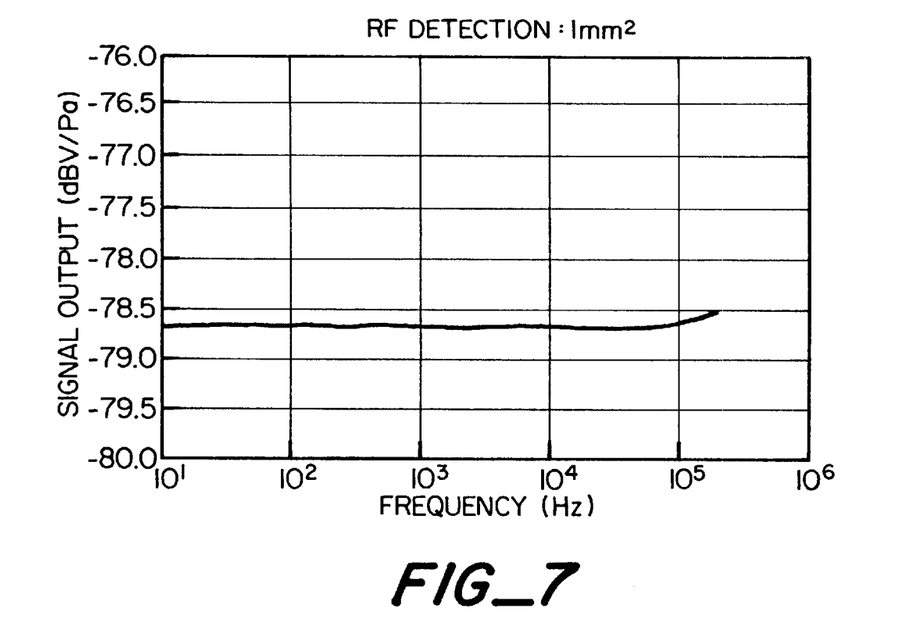
FIG. 7 shows an output signal level for a typical microphone using RF detection.
Figure 8:
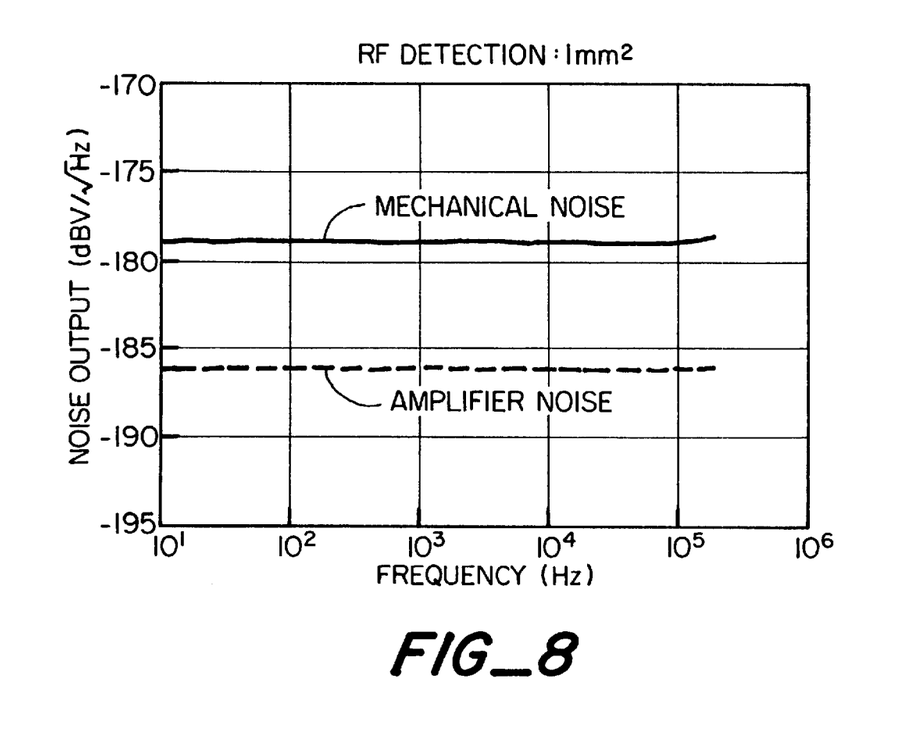
FIG. 8 shows the output noise level for the microphone of FIG. 7.

The sensitivity of the microphone can be increased by increasing the number of membranes or cells. An example is to provide a microphone which includes a large number of membranes 11 which define cells with their electrodes 12 connected in series by lines 16 as schematically shown in FIG. 6. One example on which to base calculations is a microphone (1 mm² in size) that consists of 83 membranes each with 55 $\mu$m radius. The membranes are 0.6 $\mu$m thick, and gap height is 0.5 $\mu$m. The metal electrodes are buried half way inside the membrane to increase efficiency. The membranes are sealed so that mechanical losses are minimized. Then, we assume that we use an RF signal of 5 GHz frequency, and amplitude of 2 V, which are possible using CMOS technology. The amplifier following the detector is assumed to have an input impedance of 50 $\Omega$, and equivalent noise voltage and noise current of 1 nV/√Hz, respectively. This amplifier is a commercially available amplifier. FIG. 7 shows the output signal as a function of the incoming acoustic signal in 1 Pascal input pressure. The output signal is plotted in dB relative to 1 V/Pa (dBV). The response is flat as proposed. However, this plot is not a good figure on its own, unless accompanied by the signal-to-noise ratio for 1 Pascal input pressure. FIG. 8 shows the output noise voltages in dBV scale as a function of the acoustical signal frequency. The output noise due to mechanical losses and the electrical noise of the amplifier are plotted separately. It is clear that, for this particular example, the mechanical noise dominates the total noise output of the system.

Figure 9:
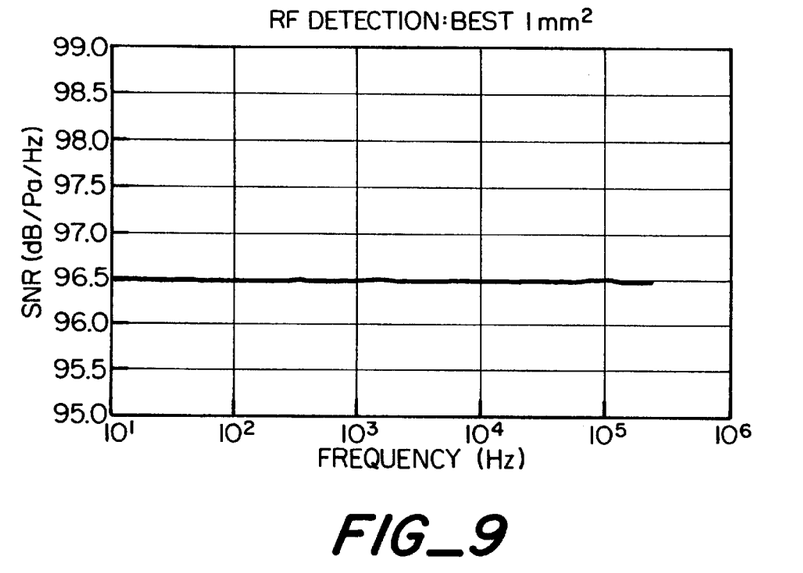
FIG. 9 shows a signal-to-noise ratio for the microphone for a 1 Pascal input pressure.

The signal-to-noise ratio of the system for 1 Pascal input pressure is plotted in FIG. 9, which also shows a flat response. Recall that the minimum sound pressure that a human ear can detect is 10 $\mu$Pa. The signal-to-noise ratio obtained for this example indicates that the minimum detectable sound pressure is around 20 $\mu$Pa. Thus, even with a microphone of size 1 mm², we are close to the sensitivity of the human ear. A microphone larger than 1 mm² in area will have a larger signal-to-noise ratio because the amplitude of the signal increases in direct proportion to the area. Thus, the signal-to-noise ratio obtained for a 1 cm² device is around 120 dB/Pa/Hz, which means a minimum detectable sound pressure of 1 $\mu$Pa., an order of magnitude higher than the sensitivity of the human ear.

In accordance with another feature of the present invention, a combination of technology and detection scheme can be used to determine the direction of sound. Several rows of cells are connected as different parallel transmission lines 21 and 22. In this fashion, one transmission line 21 can be used as a reference for the others 22, FIG. 10, and thus allow the determination of the direction of incidence of a sound wave. In other words, it enables the location of a sound source, or alternatively, it enables picking up one sound source preferentially over one or many others. The detection scheme can thus measure amplitude and phase on incident signals to enhance this direction finding capability. Also, several transmission lines can be laid out at different angle with respect to each other to distinguish sound sources coming from different directions in three dimensions in space.

Figure 10:
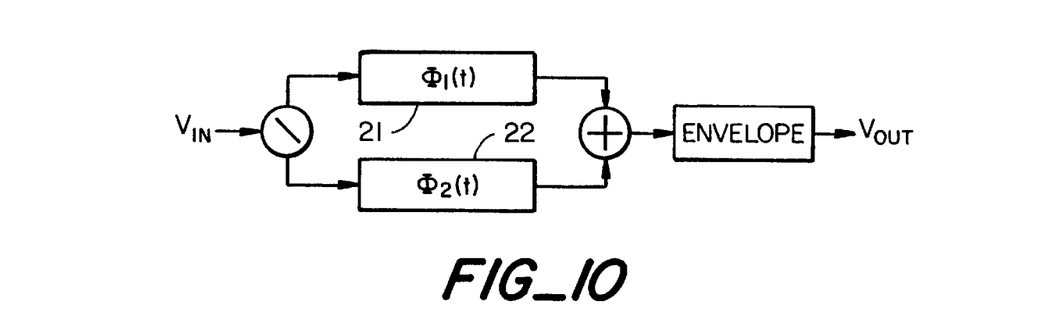
FIG. 10 illustrates two rows of microphones connected to determine the direction of incoming sound.

If the output of two rows of detectors are interfered as shown in FIG. 10, instead of interfering one with an electrical reference (as in FIG. 5), then we get a measure of the direction of the incoming acoustical signal. The reason behind this is that there is a spatial separation between the two rows of detectors, and a phase delay in the detected signals as it arrives at the second row of cells.

Figure 11:
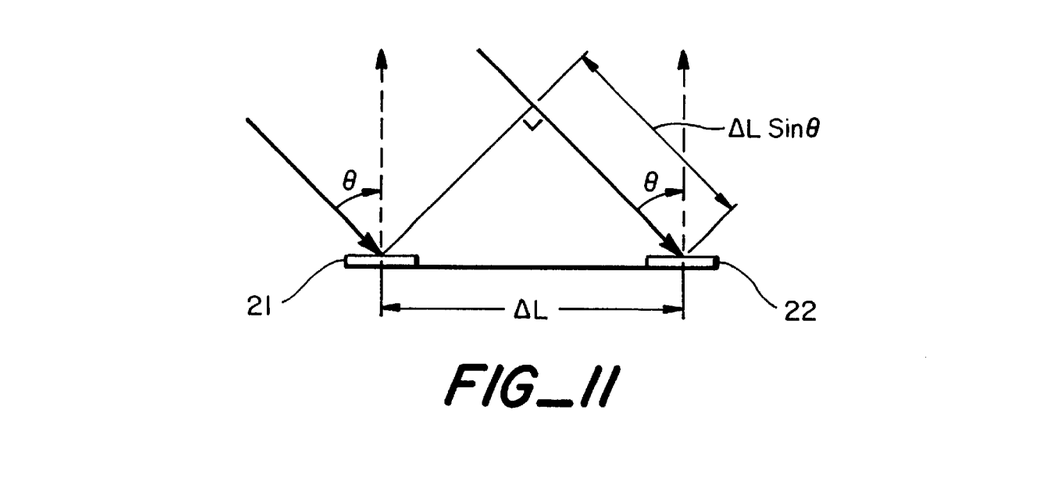
FIG. 11 illustrates the acoustic signals arriving at an angle with respect to the detector rows.

In the schematic direction sensing system shown in FIG. 10, $\Phi_1(t)=\Phi_0+\Delta\Phi_1(t)$, and $\Phi_2(t)=\Phi_0+\Phi_d+\Delta\Phi_1(t-\Delta t)$. $\Delta t=\Delta L \sin\theta/c$ is the difference between the arrival times of the signal to the two detector rows. Here, c is the speed of sound in air, $\theta$ and $\Delta L$ are defined as in FIG. 11, and $\Phi_d$ is the phase difference between the two detectors.

By properly adjusting the intentional phase difference $\Phi_d$ between the two detectors, we can write the output of this system as $$V_{out} = V_{RF}\left(1 + \frac{1}{4}a\Phi_0 \frac{\Delta x}{x_0} \cdot \frac{2\pi\Delta L}{\lambda}\sin\theta \cdot \sin(\omega_a t)\right) \quad (4)$$

We see from Equation 4 that the output of the direction sensing system is proportional to the sine of the angle of incidence. Thus, the direction of incidence can be measured using this system. For example, a signal coming at right angles to the detectors results in no output signal. As the angle of incidence changes, the amplitude of the direction-indicating signal changes. When the signal detection system and the direction sensing system are used together, both the signal itself and its direction are determined.

Figure 12:
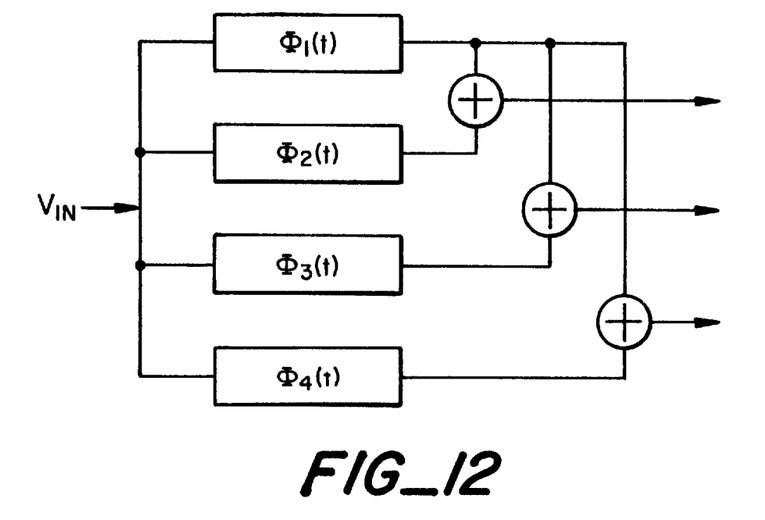
FIG. 12 shows a directional sound detector using a four-row array of microphones.

Notice that the direction indicating signal is very similar to the signal itself except for a scaling factor of $2\pi\Delta L/\lambda$. This means that with two detectors separated by 2 mm ($\Delta L=2$ mm), and for an incident signal at 1 KHz the direction indicating signal is ~30 dB below the signal itself. This amount is tolerable with the RF detection method for it already provides a typical improvement of 80 dB over the conventional method. Furthermore, we are not limited to two detectors. We can increase the number of detectors to form an array, and improve the signal-to-noise ratio in direction sensing. This is illustrated by the four-row array of FIG. 12. It is also possible to operate the detectors at different RF frequencies to tune the sensitivity of individual elements which has the effect of apodization.

Figure 13:
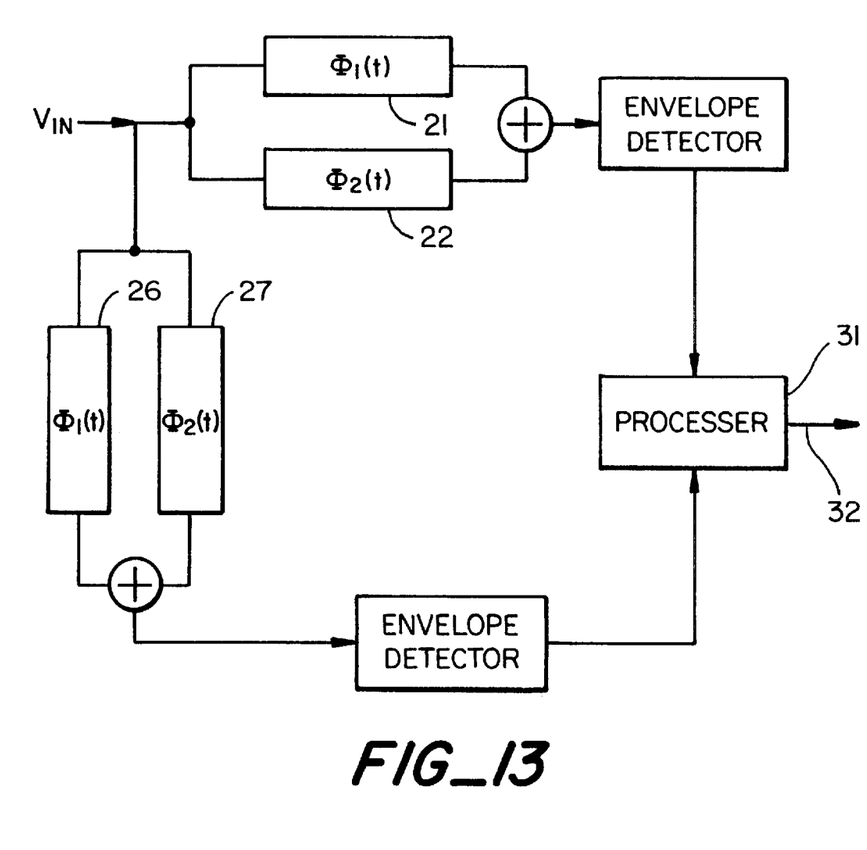
FIG. 13 schematically illustrates a two-dimensional direction-finding arrangement.

Although the expressions are determined for a two-dimensional problem, by using two similar detectors at right angles to each other it is possible to determine the angle of incidence in three dimensions. This is schematically illustrated in FIG. 13, where two rows of membranes 21 and 22 are disposed at right angles to two rows of membranes 26 and 27. The output signals from the two detector arrays are processed by a processor 31 to give a directional signal 32.

We have described how we detect acoustical signals using capacitive membranes. We integrate the membranes in the form of an artificial transmission line, and measure the change in the electrical length of the line caused by the change in the capacitance of the membranes. In a very similar manner it is also possible to measure the change in the inductance by measuring the change in the electrical length. This can be accomplished by putting small inductors in the form of thin lines on the membranes. Then, the incoming acoustical signal modulates the inductance due to stretching, as well as the capacitance due to the change in gap height.

Although specifically described for the detection of acoustical signals, the method easily applies to pressure sensing because the gap height is directly determined by the outside pressure.

The device is also capable of transmitting sound over a broad frequency range. Significant displacements can be induced on the membranes if the excitation frequency is chosen to be at or near the resonant frequency of the device membranes. This displacement can be used to add several useful features to the device, such as self-cleaning, locating of array elements and self-calibration. The devices can be used to transmit sound by applying low frequency voltages between the electrodes together with a DC bias voltage to cause the membranes to oscillate, preferably at their resonant frequency. The DC bias voltage changes the tension on the cMUT membrane altering its resonant frequency and the gap thickness.

It is possible to get non-uniformities during the fabrication process such that the individual elements of an array may have different frequency responses and sensitivities. A DC bias can be used to tune out these differences while still using RF detection. This feature adds a self-adjustment capability and reduces the problem of microphone non-uniformity.

Figure 14:
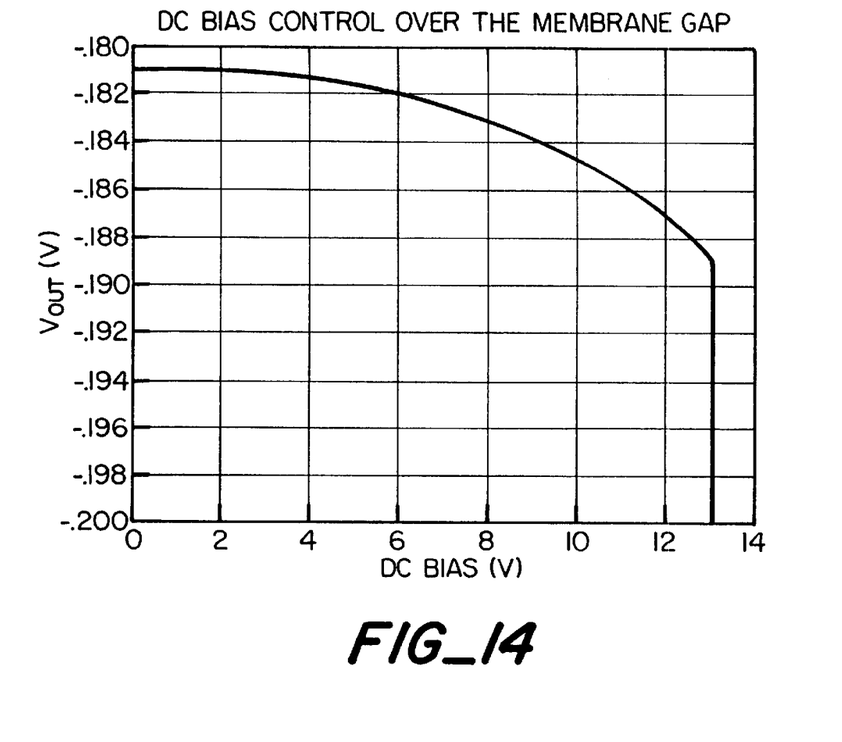
FIG. 14 shows the output voltage as measured with changing bias voltage indicating the capacitance change of the membrane.

FIG. 14 shows the change of output voltage with changes in the membrane gap resulting from applied DC bias voltage. The measurement is done with the RF detection method described above. This figure shows us two important things. First of all we can indeed adjust the membrane height and the receiver sensitivity. Secondly, the RF measurement system works well even for static membrane deflections which is not possible with the conventional detection methods. This feature opens a wide application area in the subsonic frequency range.

Figure 15:
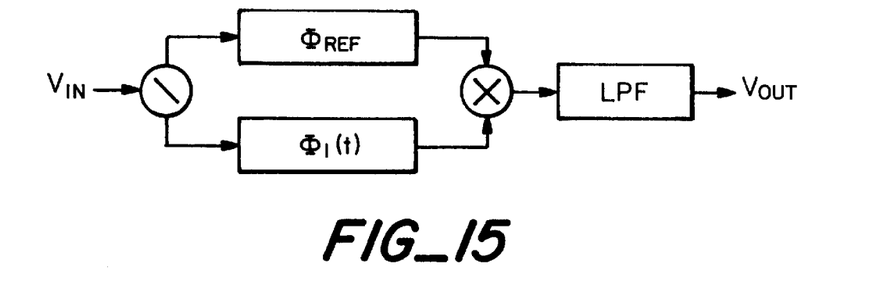
FIG. 15 schematically illustrates a circuit for measuring the phase modulation of the RF signal.

The RF detection method described for the cMUTs is based on measuring the phase-modulation on the RF signal created by the incoming acoustical signal. This phase-modulation can be measured by down-converting the residual sidebands, and subsequent low-pass filtering as shown in FIG. 15, or by using an interferometer, FIG. 5. Another way of measuring the phase-modulation is to incorporate the artificial transmission line in the feedback path of an oscillator. Then, the output of the oscillator is a frequency modulated signal where the modulating signal is the incoming acoustical signal. The acoustical signal can be detected by using an FM demodulator.

Figure 16:
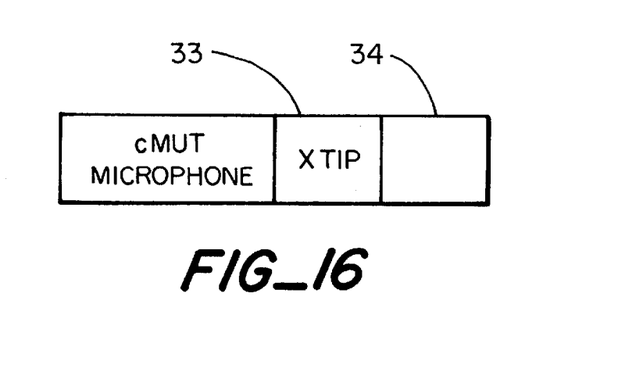
FIG. 16 is a schematic diagram of a wireless microphone.

If the RF frequency is chosen to be a frequency whose electromagnetic transmission in possible, then the FM demodulator can be remote. This turns out to be a wireless microphone with a very simple electronics. The transmitter electronics 33 can be integrated into the cMUT substrate, as schematically shown in FIG. 16. The output of the transmitter is transmitted by an antenna 34, which can be formed by thin film techniques to provide a wireless microphone.

Figure 17:
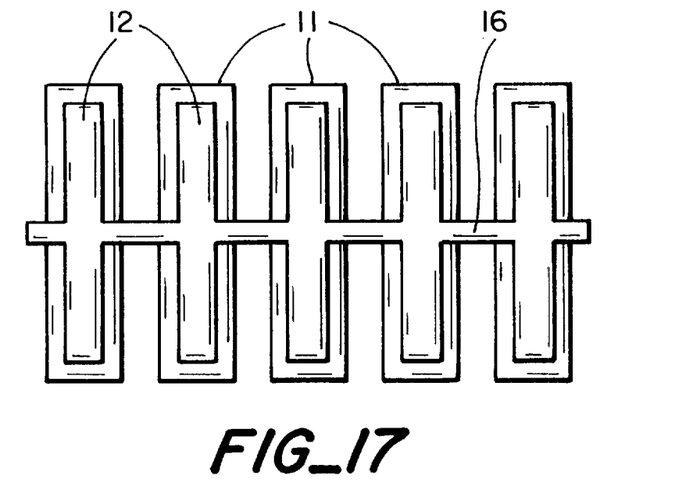
FIG. 17 shows an array of microphones using rectangular membranes.
Figure 18:
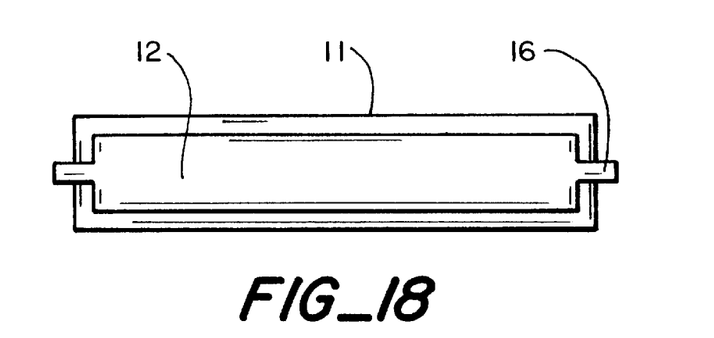
FIG. 18 shows a variation of the rectangular membranes of FIG. 17.

The microphone examples described above consisted of circular membranes. It is believed that this is not the best geometry. Calculations show that rectangular membranes exhibit smaller structural losses and lower mechanical impedance. Besides, the ratio of the active area to the total microphone area can be made larger with rectangular membranes, resulting in a more efficient microphone. This means larger membrane displacement for unit-input pressure, and therefore larger output signal and higher signal-to-noise ratio. Rectangular membranes can be employed in the RF detection in the same way circular membranes are employed. FIG. 17 shows an array employing rectangular membranes 11 and electrode 12. FIG. 18 shows an alternate orientation for the rectangular elements.

During the use of the microphone, the active surface of the device can be subject to humidity due to condensation or because of direct exposure to rain etc. By using the device in the transmitter mode, one can induce standing capillary waves with large displacements on the fluid on the membrane, which is then ejected as small droplets from the peaks of the standing capillary waves, eventually getting rid of the moisture in the form of droplets, and other possible solid particles. This gives the device a self-cleaning capability.

When a number of microphones are deployed to listen to activity in a large area, the transmit capability can be used to determine the relative locations of the microphones. For example, the microphones can be deployed to monitor intrusion into secure or protected areas. For such purposes the location of each microphone must be known to pinpoint the intrusion zone or area. This can be done either after the microphones are located on the ground at their permanent positions or after they have been dispersed without order such as by dropping from an airplane via parachutes when used, for example, for military security. The microphone whose location is to be pinpointed can be excited to transmit electromagnetic energy in the RF range using microphones with small antennas connected to the RF circuit, FIG. 16, and exciting the microphone. RF receivers can triangulate the location. In the alternative, the microphones can be excited in the sonic or ultrasonic range (up to several hundred KHz) as long as the attenuation of sound is at a tolerable level. Spaced microphones are positioned to receive the sound from the other microphone. The location of the microphone is determined by the time delay of the signal to the receiving microphones, in essence an acoustic triangulation.

Figure 19:
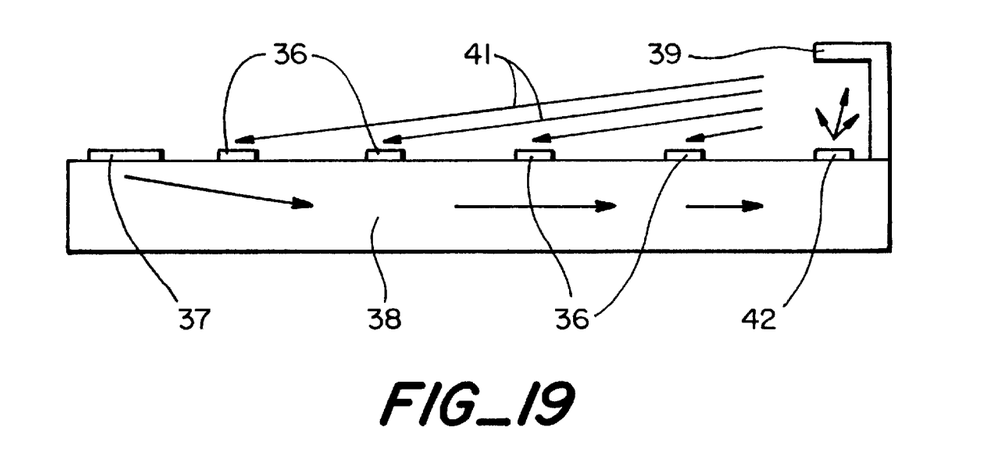
FIG. 19 illustrates arrangements for calibrating a microphone array.

The calibration of the microphone or array of microphones 36 on a device can be performed by transmitting beacon signals from designated transmitters 37 on the same device. As depicted in FIG. 19, the beacon signal can be sent through the supporting silicon structure 38 using the cross-coupling waves, such as plate waves. The plate waves travel to reflector 39 where they are converted to sound waves 41 which impinge upon the microphones 36. Since plate waves are not affected by the surrounding medium, they would provide a robust means of calibration. A sound wave can also be generated by a calibration cMUT transmitter 42 in air and can be directed to the microphone(s) by the help of the built-in reflector 39. Knowing the strength of the beacon signals 41, the microphone sensitivity can be adjusted to have proper signal levels.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A wide frequency band microphone including
a plurality of evacuated micromachined capacitive cells, each cell including a rectangular membrane supported above a common conductive electrode by an insulating support and each membrane supporting a conductive electrode for movement therewith whereby each electrode forms with the common conductive electrode a capacitor whose capacitance varies with movement of the membrane relative to the common electrode, and
conductive lines interconnecting conductive electrodes of adjacent cells.

2. A wide frequency band microphone as in claim 1 in which the cells are arranged in a two-dimensional matrix.

3. The method of operating a micromachined capacitive microphone of the type which includes a plurality of micromachined capacitive cells arranged in a two-dimensional array over a broad frequency band, said cells each comprising a membrane supported by an insulating support above a common conductive electrode with a conductive electrode on each of said membranes to form with said spaced common electrode a capacitor,
said method comprising connecting said cells in series with conductive connecting lines whereby said connecting lines and said capacitors form a high frequency transmission line whose length varies with changes in the capacitance of said cells and inductance of said lines, applying a DC voltage between the conductive electrodes of said cells and the common conductive electrode,
applying a high frequency RF voltage to said high frequency transmission line, and
determining the change in electrical length of the line responsive to a received acoustic signal to provide an output signal representative of the acoustic signal.

4. The method of claim 3 including the additional step of employing two parallel rows of connected microphones to form parallel transmission lines, applying a reference RF voltage to the input of one of said rows and determining from the difference in RF length of the output of said two lines the direction of the incoming acoustic wave.

5. A method as in claim 4 including an additional pair of parallel lines disposed at an angle to the first pair to determine the direction of the incoming acoustic signal.

6. A wide frequency band microphone including:
a plurality of micromachined capacitive microphone cells arranged in a two-dimensional array, each cell including a membrane supported above a common conductive electrode by an insulating support and each membrane supporting a conductive electrode for movement therewith whereby each electrode forms with the common conductive electrode a capacitor whose capacitance varies with movement of the membrane relative to the common electrode,
a conductive line interconnecting all conductive electrodes of cells in said array in series, whereby the inductance of said conductive line and the capacitance of said capacitors form a high frequency transmission line whose electrical length changes responsive to movement of said membrane.

7. A wide frequency band microphone as in claim 6 in which the cells are arranged in a two-dimensional matrix.

8. A wide frequency band microphone as in claim 6 or 7 in which the membranes are rectangular.

9. The method of operating a micromachined capacitive microphone of the type which includes a plurality of micromachined capacitive cells arranged in a two-dimensional array over a broad frequency band, said cells each comprising a membrane supported by an insulating support above a common conductive electrode with a conductive electrode on each of said membranes to form with said spaced common electrode a capacitor, said method comprising:

connecting said cells in series with conductive connecting lines whereby said connecting lines and said capacitors form a high frequency transmission line whose length varies with changes in the capacitance of said cells and inductance of said lines, applying a high frequency RF voltage to said high frequency transmission line, determining the change in electrical length of the line responsive to a received acoustic signal to provide an output signal representative of the acoustic signal, and employing two parallel rows of connected microphones in said array to form parallel transmission lines, applying an RF voltage to the input of one of said rows and using it as a reference for determining from the difference in RF length the output of said two lines the direction of the incoming acoustic wave.

10. A method of claim 9 including an additional pair of parallel lines disposed at an angle to the first pair to determine the direction of the incoming acoustic signal.

11. A method of cleaning a surface of a wide frequency band microphone of the type including:

a plurality of evacuated micromachined capacitive cells, each cell including a rectangular membrane supported above a common conductive electrode by an insulating support and each membrane supporting a conductive electrode for movement therewith whereby each electrode forms with the common conductive electrode a capacitor whose capacitance varies with movement of the membrane relative to the common electrode, and conductive lines interconnecting conductive electrodes of adjacent cells which comprises:

applying an alternating voltage between the conductive line and conductive line and conductive electrode and the common conductive electrode to cause the membranes to vibrate.

12. A wide frequency band microphone including:

a plurality of evacuated, micromachined capacitive cells, each cell including a membrane supported above a common conductive electrode by an insulating support and each membrane supporting a conductive electrode for movement therewith whereby each electrode forms with the common conductive electrode a capacitor whose capacitance varies with movement of the membrane relative to the common electrode, conductive lines independently interconnecting conductive electrodes of two parallel rows of adjacent cells in series whereby the inductance of said conductive lines and the capacitance of said capacitors form two parallel high frequency transmission lines whose electrical length changes responsive to movement of said membrane in response to sound, and means connected to said two transmission lines for determining from the change in electrical length between the two lines the direction of the source of sound received by the microphone.

13. A wide frequency band microphone as in claim 12 which includes at least two sets of said two parallel lines of cells disposed at an angle with respect to each other.

14. A wide frequency band microphone as in claim 13 in which the angle is a right angle.

15. A wide frequency band microphone as in claim 12 including means connected to one of said transmission lines for determining from the change in electrical length of said line the intensity of the sound as well as its direction.

16. The method of locating a wide frequency band microphone including:

a plurality of evacuated micromachined capacitive cells, each cell including a membrane supported above a common conductive electrode by an insulating support and each membrane supporting a conductive electrode for movement therewith whereby each electrode forms with the common conductive electrode a capacitor whose capacitance varies with movement of the membrane relative to the common electrode, conductive lines interconnecting conductive electrodes of adjacent cells which comprises:

exciting the microphone by applying an AC voltage between the conductive electrodes and the common electrode to cause the membranes to vibrate and emit sound, receiving the sound waves at two spaced locations, and determining the position of said microphone by detecting the difference in arrival time of the acoustic signal at the two spaced locations to thereby triangulate the position of the microphone.

* * * * *